(12) United States Patent
Tsou et al.

(10) Patent No.: US 11,169,309 B2
(45) Date of Patent: Nov. 9, 2021

(54) INFRARED BANDPASS FILTER HAVING SILICON ALUMINUM HYDRIDE LAYERS

(71) Applicant: Kingray Technology Co., Ltd., Zhudong Township, Hsinchu County (TW)

(72) Inventors: Cheng-Hsing Tsou, Zhudong Township (TW); Wei-Hao Cheng, Zhudong Township (TW); Pei-Yuan Ni, Zhudong Township (TW)

(73) Assignee: KINGRAY TECHNOLOGY CO., LTD., Hsinchu County (TW)

( * ) Notice: Subject to any disclaimer, the term of this patent is extended or adjusted under 35 U.S.C. 154(b) by 275 days.

(21) Appl. No.: 16/596,727

(22) Filed: Oct. 8, 2019

(65) Prior Publication Data
US 2021/0103082 A1  Apr. 8, 2021

(51) Int. Cl.
| | |
|---|---|
| G02B 1/11 | (2015.01) |
| G02B 5/28 | (2006.01) |
| G02B 1/115 | (2015.01) |
| G02B 13/14 | (2006.01) |

(52) U.S. Cl.
CPC ............... G02B 5/281 (2013.01); G02B 1/11 (2013.01); G02B 1/115 (2013.01); G02B 5/285 (2013.01); *G02B 13/14* (2013.01)

(58) Field of Classification Search
CPC .......... G02B 1/11; G02B 1/115; G02B 5/281; G02B 5/285; G02B 13/14
See application file for complete search history.

(56) References Cited

U.S. PATENT DOCUMENTS

| | | | | |
|---|---|---|---|---|
| 7,901,870 B1* | 3/2011 | Wach | ................. | G02B 5/28 |
| | | | | 430/321 |
| 2014/0014838 A1* | 1/2014 | Hendrix | ............. | G02B 5/281 |
| | | | | 250/338.1 |
| 2015/0091116 A1* | 4/2015 | D'aillon | ................ | G02B 5/281 |
| | | | | 257/432 |

(Continued)

FOREIGN PATENT DOCUMENTS

| | | | |
|---|---|---|---|
| CN | 112462461 A | * 3/2021 | |
| DE | 102019127139 B3 | * 10/2020 | ............ G02B 5/208 |

(Continued)

OTHER PUBLICATIONS

Thorgersen et al., "Structure and Optical Properties of aSiAl and aSiAlHx Magnetron Sputtered Thin Films", APL Materials 4, 036103 (2016), published Mar. 18, 2016 (Year: 2016).*

*Primary Examiner* — Ryan S Dunning
(74) *Attorney, Agent, or Firm* — Leong C. Lei

(57) ABSTRACT

An infrared bandpass filter structure is formed by alternately stacking a plurality of silicon aluminum hydride layers and a plurality of low-refractive-index layers. The plurality of low-refractive-index layers include oxide. The infrared bandpass filter structure has a pass band that at least partly overlaps the wavelength range of 800 nm-1600 nm. The pass band have a center wavelength, and the center wavelength has a magnitude of shift that is less than 11 nm when an incident angle changes from 0° to 30. An infrared bandpass filter includes the infrared bandpass filter structure formed on a first side surface of a substrate and an antireflection layer formed on a second side surface of the substrate that is at a side opposite to the first side surface.

16 Claims, 10 Drawing Sheets

| | | | | | |
|---|---|---|---|---|---|
| 1 | SiAl:O2 | 33 | 15 | SiAl:O2 | 105.86 |
| 2 | SiAl:H | 26.44 | 16 | SiAl:H | 247.94 |
| 3 | SiAl:O2 | 77.13 | 17 | SiAl:O2 | 104.76 |
| 4 | SiAl:H | 12.48 | 18 | SiAl:H | 81.72 |
| 5 | SiAl:O2 | 261.02 | 19 | SiAl:O2 | 114.82 |
| 6 | SiAl:H | 70.81 | 20 | SiAl:H | 120.86 |
| 7 | SiAl:O2 | 132.4 | 21 | SiAl:O2 | 40.76 |
| 8 | SiAl:H | 133.91 | 22 | SiAl:H | 114.91 |
| 9 | SiAl:O2 | 130.96 | 23 | SiAl:O2 | 158.1 |
| 10 | SiAl:H | 77.99 | 24 | SiAl:H | 46.87 |
| 11 | SiAl:O2 | 138.15 | 25 | SiAl:O2 | 62.74 |
| 12 | SiAl:H | 387.64 | 26 | SiAl:H | 14.27 |
| 13 | SiAl:O2 | 113.17 | 27 | SiAl:O2 | 30 |
| 14 | SiAl:H | 80.76 | | | |

(56) References Cited

U.S. PATENT DOCUMENTS

2016/0011350 A1\* 1/2016 Erdogan ............... G02B 5/28
                                                 359/589
2016/0238759 A1\* 8/2016 Sprague ............. C23C 14/3414
2017/0357033 A1\* 12/2017 Ockenfuss .......... C23C 14/3457
2019/0352222 A1\* 11/2019 Zhang .................... C03C 17/36

FOREIGN PATENT DOCUMENTS

| FR | 3099956 A1 | \* | 2/2021 | ............. G02B 5/288 |
| GB | 2588135 A | \* | 4/2021 | ............. G02B 5/282 |
| JP | 2021056455 A | \* | 4/2021 | |
| KR | 10-2021-0030526 | \* | 3/2021 | |

\* cited by examiner

| 1 | SiAl:O2 | 33 | 15 | SiAl:O2 | 105.86 |
| 2 | SiAl:H | 26.44 | 16 | SiAl:H | 247.94 |
| 3 | SiAl:O2 | 77.13 | 17 | SiAl:O2 | 104.76 |
| 4 | SiAl:H | 12.48 | 18 | SiAl:H | 81.72 |
| 5 | SiAl:O2 | 261.02 | 19 | SiAl:O2 | 114.82 |
| 6 | SiAl:H | 70.81 | 20 | SiAl:H | 120.86 |
| 7 | SiAl:O2 | 132.4 | 21 | SiAl:O2 | 40.76 |
| 8 | SiAl:H | 133.91 | 22 | SiAl:H | 114.91 |
| 9 | SiAl:O2 | 130.96 | 23 | SiAl:O2 | 158.1 |
| 10 | SiAl:H | 77.99 | 24 | SiAl:H | 46.87 |
| 11 | SiAl:O2 | 138.15 | 25 | SiAl:O2 | 62.74 |
| 12 | SiAl:H | 387.64 | 26 | SiAl:H | 14.27 |
| 13 | SiAl:O2 | 113.17 | 27 | SiAl:O2 | 30 |
| 14 | SiAl:H | 80.76 | | | |

| | | | | | |
|---|---|---|---|---|---|
| 1 | SiAl:O2 | 62.69 | 17 | SiAl:O2 | 88.94 |
| 2 | SiAl:H | 109.09 | 18 | SiAl:H | 95.79 |
| 3 | SiAl:O2 | 59.91 | 19 | SiAl:O2 | 119.63 |
| 4 | SiAl:H | 152.34 | 20 | SiAl:H | 114.05 |
| 5 | SiAl:O2 | 34.07 | 21 | SiAl:O2 | 59.3 |
| 6 | SiAl:H | 125.25 | 22 | SiAl:H | 299.89 |
| 7 | SiAl:O2 | 115.86 | 23 | SiAl:O2 | 43.94 |
| 8 | SiAl:H | 91.99 | 24 | SiAl:H | 120.46 |
| 9 | SiAl:O2 | 86.54 | 25 | SiAl:O2 | 110.52 |
| 10 | SiAl:H | 431 | 26 | SiAl:H | 99.37 |
| 11 | SiAl:O2 | 60.87 | 27 | SiAl:O2 | 152.08 |
| 12 | SiAl:H | 95.01 | 28 | SiAl:H | 143.79 |
| 13 | SiAl:O2 | 85.89 | 29 | SiAl:O2 | 75.73 |
| 14 | SiAl:H | 90.67 | 30 | SiAl:H | 116.58 |
| 15 | SiAl:O2 | 61.05 | 31 | SiAl:O2 | 36 |
| 16 | SiAl:H | 434.81 | | | |

FIG. 5

| | | | | | |
|---|---|---|---|---|---|
| 1 | SiAl:O2 | 32.7 | 19 | SiAl:O2 | 47.22 |
| 2 | SiAl:H | 120.12 | 20 | SiAl:H | 466.28 |
| 3 | SiAl:O2 | 34.79 | 21 | SiAl:O2 | 107.28 |
| 4 | SiAl:H | 304.66 | 22 | SiAl:H | 93.31 |
| 5 | SiAl:O2 | 76.68 | 23 | SiAl:O2 | 111.66 |
| 6 | SiAl:H | 124.98 | 24 | SiAl:H | 118.03 |
| 7 | SiAl:O2 | 81.7 | 25 | SiAl:O2 | 14.81 |
| 8 | SiAl:H | 125.92 | 26 | SiAl:H | 327.81 |
| 9 | SiAl:O2 | 26.05 | 27 | SiAl:O2 | 111.66 |
| 10 | SiAl:H | 594.06 | 28 | SiAl:H | 94.45 |
| 11 | SiAl:O2 | 85.91 | 29 | SiAl:O2 | 153.59 |
| 12 | SiAl:H | 95.75 | 30 | SiAl:H | 159.36 |
| 13 | SiAl:O2 | 118.15 | 31 | SiAl:O2 | 44.4 |
| 14 | SiAl:H | 587.51 | 32 | SiAl:H | 60.91 |
| 15 | SiAl:O2 | 78.77 | 33 | SiAl:O2 | 15.91 |
| 16 | SiAl:H | 101.44 | 34 | SiAl:H | 41.79 |
| 17 | SiAl:O2 | 73.68 | 35 | SiAl:O2 | 30 |
| 18 | SiAl:H | 122.86 | | | |

FIG. 7

| | | | | | |
|---|---|---|---|---|---|
| 1 | SiAl:O2 | 33.73 | 18 | SiAl:H | 68.5 |
| 2 | SiAl:H | 67.86 | 19 | SiAl:O2 | 155.65 |
| 3 | SiAl:O2 | 84.71 | 20 | SiAl:H | 46.16 |
| 4 | SiAl:H | 182.94 | 21 | SiAl:O2 | 177.43 |
| 5 | SiAl:O2 | 168.78 | 22 | SiAl:H | 336.33 |
| 6 | SiAl:H | 86.83 | 23 | SiAl:O2 | 65.17 |
| 7 | SiAl:O2 | 172.13 | 24 | SiAl:H | 99.59 |
| 8 | SiAl:H | 112.51 | 25 | SiAl:O2 | 131.65 |
| 9 | SiAl:O2 | 30.17 | 26 | SiAl:H | 174.27 |
| 10 | SiAl:H | 509.36 | 27 | SiAl:O2 | 120.69 |
| 11 | SiAl:O2 | 141.79 | 28 | SiAl:H | 70.09 |
| 12 | SiAl:H | 78.69 | 29 | SiAl:O2 | 127.82 |
| 13 | SiAl:O2 | 200.12 | 30 | SiAl:H | 59.96 |
| 14 | SiAl:H | 43.2 | 31 | SiAl:O2 | 90.99 |
| 15 | SiAl:O2 | 160.12 | 32 | SiAl:H | 28.6 |
| 16 | SiAl:H | 494.76 | 33 | SiAl:O2 | 38.15 |
| 17 | SiAl:O2 | 145.59 | | | |

FIG. 9

| 1 | SiAl:O2 | 29.1 | 20 | SiAl:H | 438.86 |
|---|---|---|---|---|---|
| 2 | SiAl:H | 79.72 | 21 | SiAl:O2 | 159.75 |
| 3 | SiAl:O2 | 28.62 | 22 | SiAl:H | 50.06 |
| 4 | SiAl:H | 314.01 | 23 | SiAl:O2 | 174.29 |
| 5 | SiAl:O2 | 140.58 | 24 | SiAl:H | 64 |
| 6 | SiAl:H | 69.23 | 25 | SiAl:O2 | 19.02 |
| 7 | SiAl:O2 | 50.53 | 26 | SiAl:H | 311.38 |
| 8 | SiAl:H | 156.8 | 27 | SiAl:O2 | 205.67 |
| 9 | SiAl:O2 | 65.12 | 28 | SiAl:H | 56.92 |
| 10 | SiAl:H | 564.26 | 29 | SiAl:O2 | 205.42 |
| 11 | SiAl:O2 | 96.79 | 30 | SiAl:H | 137.8 |
| 12 | SiAl:H | 75.02 | 31 | SiAl:O2 | 24.41 |
| 13 | SiAl:O2 | 118.93 | 32 | SiAl:H | 15.64 |
| 14 | SiAl:H | 572.42 | 33 | SiAl:O2 | 29.67 |
| 15 | SiAl:O2 | 98.88 | 34 | SiAl:H | 63.2 |
| 16 | SiAl:H | 74.93 | 35 | SiAl:O2 | 24.38 |
| 17 | SiAl:O2 | 122.24 | 36 | SiAl:H | 6.34 |
| 18 | SiAl:H | 87.28 | 37 | SiAl:O2 | 53.33 |
| 19 | SiAl:O2 | 20.78 | | | |

INFRARED BANDPASS FILTER HAVING SILICON ALUMINUM HYDRIDE LAYERS

TECHNICAL FIELD OF THE INVENTION

The present invention relates to a technical field concerning an infrared bandpass filter structure and a structure of a filter device, and more particularly to an infrared bandpass filter structure and an infrared bandpass filter using the structure that enhances sputtering efficiency and greatly lower fabrication costs, and helps reduce warpage of film layers so as to eliminate chipping occurring in a cutting operation carried out in a post-fabrication process.

DESCRIPTION OF THE PRIOR ART

Filters are commonly classified as bandpass filters, short-wave cutoff filters, and long-wave cutoff filters. A bandpass filter allows light within a predetermined band of wavelength to pass, while cuts off light outside the pass band, and is generally classified as narrow band devices and broad band devices according to band width. According to a ratio of the bandwidth to the center wavelength, those having a value hat is less than 5% is classified as a narrow band device, while those greater than 5% are considered a wide band device. To reduce interference caused by surrounding visible light, narrow-band interfering filters are commonly used. Traditional RGB visible light camera lens often adopts infrared cutoff filter to filter out unnecessary low-frequency near infrared light in order to avoid influences that the infrared light causes on the visible light portion to generate fake color or ripple patterns, and also to enhance effective resolution and color restoration. However, to avoid the interferences caused by the surrounding light, the infrared lenses must be used in combination with a narrow-band filter (namely an infrared bandpass filter) to allow only near infrared light of a specific band to pass.

A known infrared bandpass filter, such as those shown in Taiwan Patent Publications 1576617 and 1648561, which disclose optical filters and detection systems, is generally made by alternately stacking a plurality of silicon hydride layers and a plurality of low-refractive-index layers. Such an infrared bandpass filter structure has a pass band, which is at least partly overlapping a wavelength range of 800 nm-1600 nm. The pass band has a center wavelength, and the center wavelength shows a shift of magnitude in the range of 12.2-20 nm when an incident angle changes from 0° to 30°. The plurality of silicon hydride layers each have an refractive index that is greater than (close to) 3.5 in a wavelength range of 800-1100 nm, while the plurality of low-refractive-index layers are an oxide, which has a refractive index less than 2 in the wavelength range of 800 nm-110 nm and may comprise at least one of silicon dioxide ($SiO_2$), aluminum(III) oxide ($Al_2O_3$), titanium dioxide ($TiO_2$), niobium pentoxide ($Nb_2O_5$), tantalum pentoxide ($Ta_2O_5$), and a mixture thereof.

However, the known infrared bandpass filter suffers the following disadvantages in practical applications:

(1) The known infrared bandpass filter that is formed by alternately stacking a plurality of silicon hydride layers and a plurality of low-refractive-index layers has a pass band of which a center wavelength has a greater magnitude of shift (around 12.2-20 nm) when an incident angle changes from 0° to 30°, and consequently, issues of incapability of recognition or failure of recognition may occur in an application for formation of three-dimensional images in receiving light at relatively large angles.

(2) Film layers of the known infrared bandpass filter are made through sputtering with a pure silicon target. Such a pure silicon target is only applicable to sputtering operations that are carried with a power of 5-6 kW, and an excessively large power would cause a target cracking condition on the pure silicon target, making it impossible to use. Thus, it would take an extended period of time for sputtering the film layers, and the efficiency of sputtering is apparently very poor, leading to an increase of fabrication costs, such as electrical power expense and working hours.

(3) The film layers of the known infrared bandpass filter have a great thickness and this would result in a large amount of warpage for coating made on a glass substrate, and consequently, issues of severe corner chipping may occur in a cutting operation carried out in a subsequent process.

SUMMARY OF THE INVENTION

The primary objective of the present invention is to overcome the drawbacks of the known infrared bandpass filter concerning low efficiency of sputtering that results in a high fabrication cost and an amount of warpage of film layers that results in corner chipping in a cutting operation carried out in a post-fabrication process.

The present invention provides an infrared bandpass filter structure, which is formed by alternately stacking a plurality of silicon aluminum hydride layers and a plurality of low-refractive-index layers. The plurality of low-refractive-index layers comprises oxide. The infrared bandpass filter structure has a pass band that at least partly overlaps the wavelength range of 800 nm-1600 nm. The pass band has a center wavelength, and the center wavelength has a magnitude of shift that is less than 11 nm when an incident angle changes from 0° to 30°.

The infrared bandpass filter according to the present invention is generally such that the above infrared bandpass filter structure is formed on a first side surface of a substrate and an antireflection layer is formed on a second side surface of the substrate that is at one side opposite to the first side surface.

The infrared bandpass filter structure and the infrared bandpass filter using such a structure according to the present invention are such that the infrared bandpass filter structure that is formed by alternately stacking a plurality of silicon aluminum hydride layers and a plurality of low-refractive-index layers has a pass band of which a center wavelength exhibits a reduced magnitude of shift that is less than 11 nm when an incident angle changes from 0° to 30°, so that applications to three-dimensional image forming systems would make it hard to generate issues of being incapable of recognition or failure of recognition. Particularly, a silicon-aluminum target that is doped with an aluminum ingredient is adopted, which is more capable of bearing more than two times of power output (around 10-20 kw) than conventionally used pure silicon targets, so that the time required for coating films can be reduced at least by half and equivalently, the throughput for the same period of time could be more than double, and thus, costs of resources including production time consumed in the entire shop, human labor, and electrical power can be cut by half to thereby greatly improve the power of competition. Further, film layers of the infrared bandpass filter structure are made with a reduced thickness due to the property of excellent ductility of the aluminum ingredient involved, so that coating on a glass substrate may provide a reduced film thickness and thus a reduced internal stress and the reduced internal stress would help prevent occurrence of corner chipping in a subsequent cutting operation thereby enhancing yield rate of the cutting operation to thus achieve, equivalently, a purpose of lowering fabrication costs.

BRIEF DESCRIPTION OF THE DRAWINGS

FIG. 5 is a schematic view showing a film layer structure of a first experiment of a second embodiment of the infrared bandpass filter structure according to the present invention.

FIG. 7 is a schematic view showing a film layer structure of a second experiment of the second embodiment of the infrared bandpass filter structure according to the present invention.

FIG. 9 is a schematic view illustrating a film layer structure of a third embodiment of the infrared bandpass filter structure according to the present invention.

DETAILED DESCRIPTION OF THE PREFERRED EMBODIMENT

Figure 1:
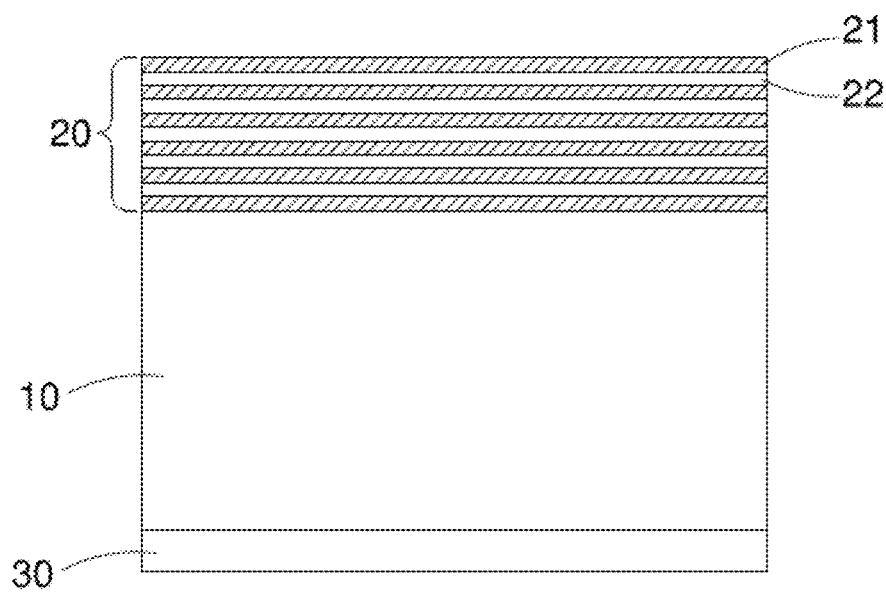
FIG. 1 is a cross-sectional view showing an infrared bandpass filter according to the present invention.

Referring to FIG. 1, an infrared bandpass filter according to the present invention is shown, comprising a substrate 10, an infrared bandpass filter structure 20, and an antireflection (AR) layer 30, wherein:

the substrate 10, which is glass and also has a first side surface and a second side surface that is located on a side opposite to the first side surface.

The infrared bandpass filter structure 20 is formed on the first side surface of the substrate 10 and is formed by alternately stacking a plurality of silicon aluminum hydride (SiAl:H) layers 21 and a plurality of low-refractive-index layers 22, such that the infrared bandpass filter structure 20 has a pass band that at least partly overlaps the wavelength range of 800 nm-1600 nm. The pass band has a center wavelength, and the center wavelength center wavelength shows a magnitude of shift that is less than 11 nm (around 10.3-10.5 nm) when an incident angle changes from 0° to 30°. Further, the infrared bandpass filter structure 20 has a thickness that is 3000-5500 nm and has a high OD value in the wavelength range of 350 nm-1600 nm, and has a high transmission rate in the wavelength range of 800 nm-1600 nm, and a reflection rate lower than 20% at the site of Rx coordinate 0.2-0.5, Ry coordinate 0.2-0.5 on a color coordinate system within the visible light range. The plurality of silicon aluminum hydride layers 21 have a refractive index of 3.1-3.6 and an extinction coefficient of 1.e-4-1.e-6 in the wavelength range of 800 nm-1600 nm and an extinction coefficient greater than 0.005 in the wavelength range of 350 nm-700 nm. The low-refractive-index layers 22 are oxide, which comprises one of silicon aluminum dioxide (SiAl:$O_2$), silicon aluminum nitride (SiAl:N), silicon nitride (SiN), silicon dioxide ($SiO_2$), aluminum(III) oxide ($Al_2O_3$), titanium dioxide ($TiO_2$), niobium pentoxide ($Nb_2O_5$), tantalum pentoxide ($Ta_2O_5$), and a mixture thereof. Further, the plurality of low-refractive-index layers 22 have a refractive index less than 1.8 and an extinction coefficient less than 0.0005 in the wavelength range of 800 nm-1600 nm and an extinction coefficient greater than 0.005 in the wavelength range of 350 nm-700 nm.

The antireflection layer 30 is formed on the second side surface of the substrate 10 and is formed by stacking a plurality of high-refractive-index materials of silicon aluminum hydride (SiAl:H) and a plurality of low-refractive-index materials. The low-refractive-index materials comprise at least one of silicon aluminum dioxide (SiAl:O2), silicon aluminum nitride (SiAl:N), silicon nitride (SiN), silicon dioxide (SiO2), aluminum(III) oxide ($Al_2O_3$), titanium dioxide ($TiO_2$), niobium pentoxide ($Bb_2O_5$), tantalum pentoxide ($Ta_2O_5$), and a mixture thereof have a thickness of 3000 nm-6000 nm.

Figure 2:
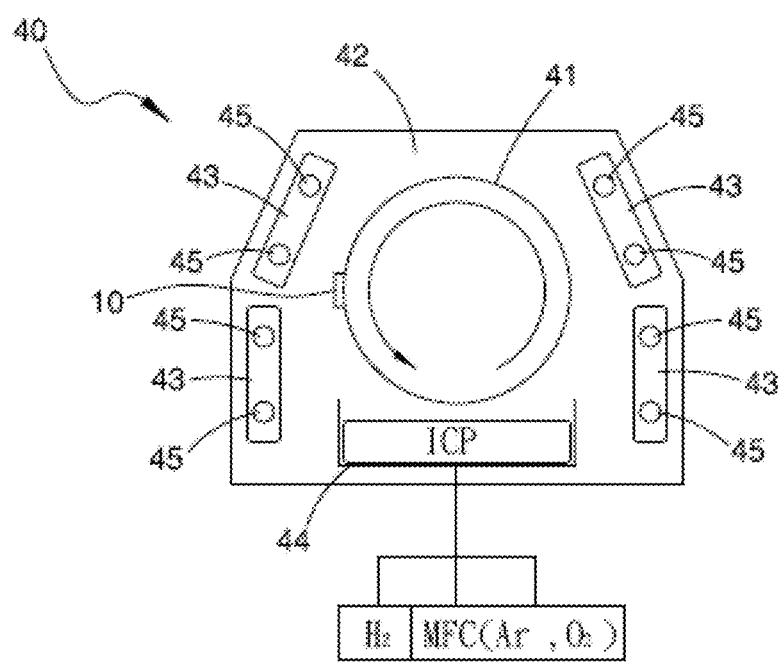
FIG. 2 is a schematic view showing a structure of a vacuum sputtering reactive coating system that is used in the present invention for carrying out a coating process.

Referring to FIG. 2, it shows a sputtering process of the silicon aluminum hydride film layers 21 of the present invention is carried out in a vacuum sputtering reactive coating system 40, in which a polycrystalline spray-coated silicon cylindrical target or a monocrystalline-silicon cylindrical target that is doped with an aluminum ingredient at 200 ppm-1500 ppm to serve as a sputtering target 45, and a fabrication process is (a) placing a clean substrate 10 on a drum 41 to have a film-coating surface facing outward; (b) having the drum 41 rotating at a uniform speed inside a coating chamber 42; (c) activating a sputtering source 43 at a vacuum level of $10^{-3}$-$10^{-4}$ pa and introducing argon gas, such that the argon gas is ionized to form a plasma to bombard the silicon-aluminum target 45 under the action of electric and magnetic fields and the silicon-aluminum material is sputtered to the substrate 10 to form a silicon-aluminum film; (d) with the rotation of the drum 200, the substrate 100 is moved toward a reaction source (rf/icp) region 44; and (e) the reaction source region 44 supplying hydrogen gas, oxygen gas, and argon gas to form plasmas for high speed movement toward the substrate 10 under the action of an electric field to finally react with the silicon-aluminum film on the substrate 10 and forms silicon aluminum hydride film layers 21 that contain hydrogen. To make the high-refractive-index films, the mixture of gas introduced through the reaction source region 44 can be used to make films having the highest refractive indexes that change from 3.1 to 4 in 800 nm to 1600 nm and extinction coefficients that are less than 0.0005 through adjusting the ratio (flowrate) of hydrogen gas. When the gas introduced through the reaction source region 44 is a mixed gas of oxygen gas and argon gas, it is possible to make films having refractive indexes that change from 1.46 to 1.7 in 350 nm to 1600 nm and extinction coefficients that are less than 0.0005.

Figures 3, 4:
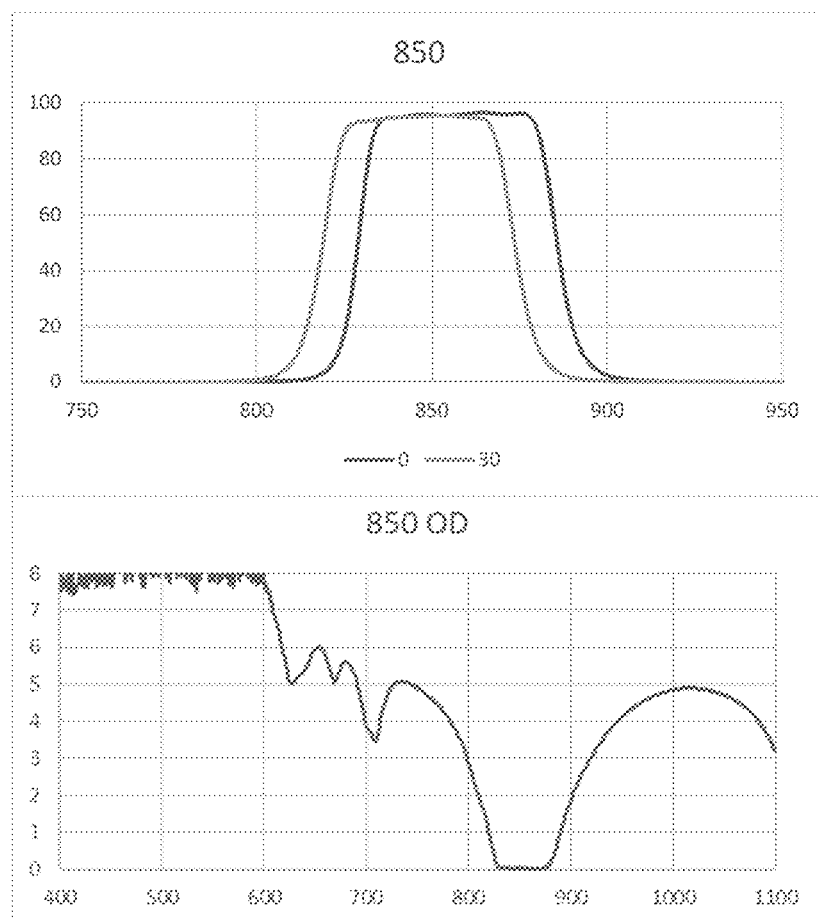
FIG. 3 is a schematic view illustrating a film layer structure of a first embodiment of the infrared bandpass filter structure according to the present invention.
FIG. 4 is a spectrum diagram of the first embodiment of the infrared bandpass filter structure according to the present invention.

Referring to FIGS. 3 and 4, a first embodiment (850 bandpass filter) of the infrared bandpass filter structure according to the present invention is shown, which is formed by alternately stacking a total number of 27 layers of silicon aluminum hydride layers and silicon aluminum dioxide layers and has an alternately-stacked thickness that is around 3500 nm. The silicon aluminum oxide layers have a refractive index greater than 3 and close to 3.6 and an extinction coefficient less than 0.0005 in the wavelength range of 800 nm-1600 nm, and have an extinction coefficient greater than 0.005 in the wavelength range of 350 nm-700 nm. The silicon aluminum dioxide layers have a refractive index less than 1.8 and an extinction coefficient less than 0.0005 in the wavelength range of 800 nm-1600 nm. The infrared bandpass filter structure that is formed through stacking has a pass band that at least partly overlaps the wavelength range of 800 nm-1600 nm, and a center wavelength of the pass band has a magnitude of shift that is less than 11 nm when an incident angle changes from 0° to 30°. This is applicable to a three-dimensional image forming system to enhance the three-dimensional image resolution.

Figure 6:
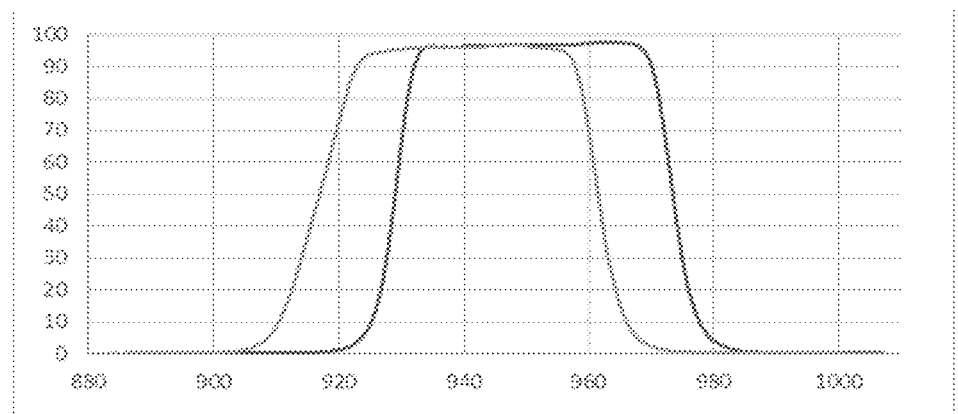
FIG. 6 is a spectrum diagram of the first experiment of the second embodiment of the infrared bandpass filter structure according to the present invention.
Figure 6:
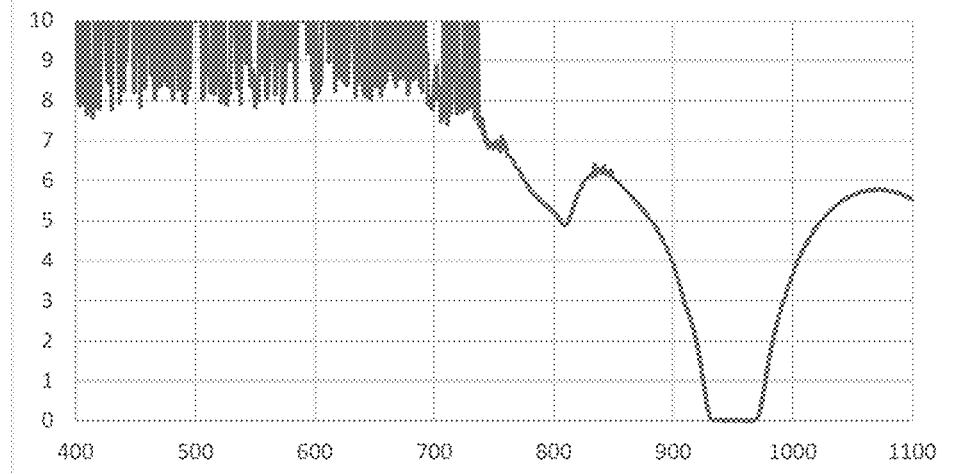

Referring to FIGS. 5 and 6, a first experiment (940 bandpass filter) of a second embodiment of the infrared bandpass filter structure according to the present invention is shown, which is formed by alternately stacking a total number of 31 layers of silicon aluminum hydride layers and silicon aluminum dioxide layers and has an alternately-stacked thickness that is around 4000 nm. The silicon aluminum oxide layers have a refractive index greater than 3 and close to 3.6 and an extinction coefficient less than 0.0005 in the wavelength range of 800 nm-1600 nm, and have an extinction coefficient greater than 0.005 in the wavelength range of 350 nm-700 nm. The silicon aluminum dioxide layers have a refractive index less than 1.8 and an extinction coefficient less than 0.0005 in the wavelength range of 800 nm-1600 nm. The infrared bandpass filter structure that is formed through stacking has a pass band that at least partly overlaps the wavelength range of 800 nm-1600 nm, and a center wavelength of the pass band has a magnitude of shift that is less than 11 nm when an incident angle changes from 0° to 30°. This is applicable to a three-dimensional image forming system to enhance the three-dimensional image resolution.

Figure 8:
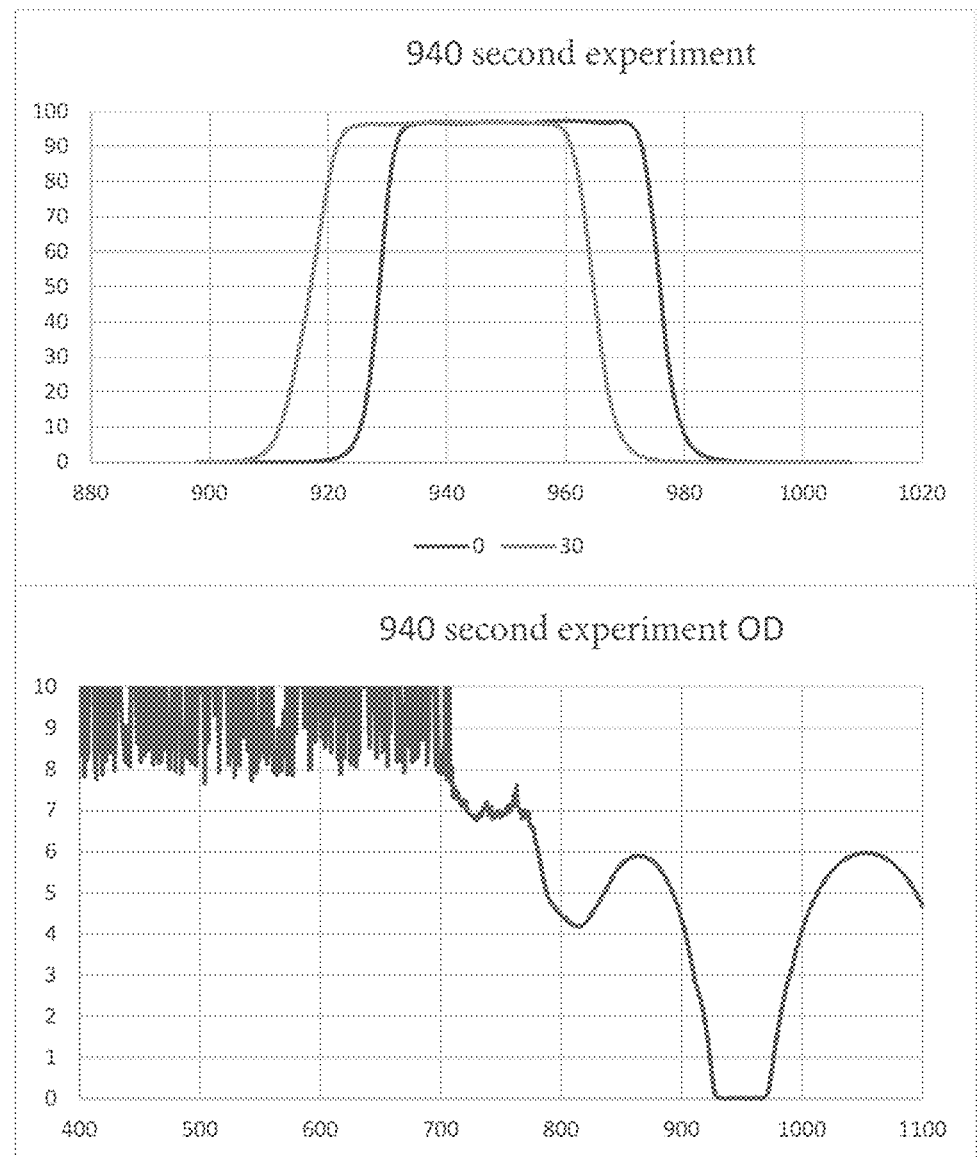
FIG. 8 is a spectrum diagram of the second experiment of the second embodiment of the infrared bandpass filter structure according to the present invention.

Referring to FIGS. 7 and 8, a second experiment (940 bandpass filter) of the second embodiment of the infrared bandpass filter structure according to the present invention is shown, which is formed by alternately stacking a total number of 35 layers of silicon aluminum hydride layers and silicon aluminum dioxide layers and has an alternately-stacked thickness that is around 4000-550 nm. The silicon aluminum oxide layers have a refractive index greater than 3 and close to 3.6 and an extinction coefficient less than 0.0005 in the wavelength range of 800 nm-1600 nm, and an extinction coefficient greater than 0.005 in the wavelength range of 350 nm-700 nm. The silicon aluminum dioxide layers have a refractive index less than 1.8 and an extinction coefficient less than 0.0005 in the wavelength range of 800 nm-1600 nm. The infrared bandpass filter structure that is formed through stacking has a pass band that at least partly overlaps the wavelength range of 800 nm-1600 nm, and a center wavelength of the pass band has a magnitude of shift that is less than 11 nm when an incident angle changes from 0° to 30°, wherein a t90-t10% slope of this example is superior to that of the first experiment (the first experiment having a slope less than 8, and the second experiment having a slope less than 7), and an OD value at the same location is also superior to that of the first embodiment.

Figure 10:
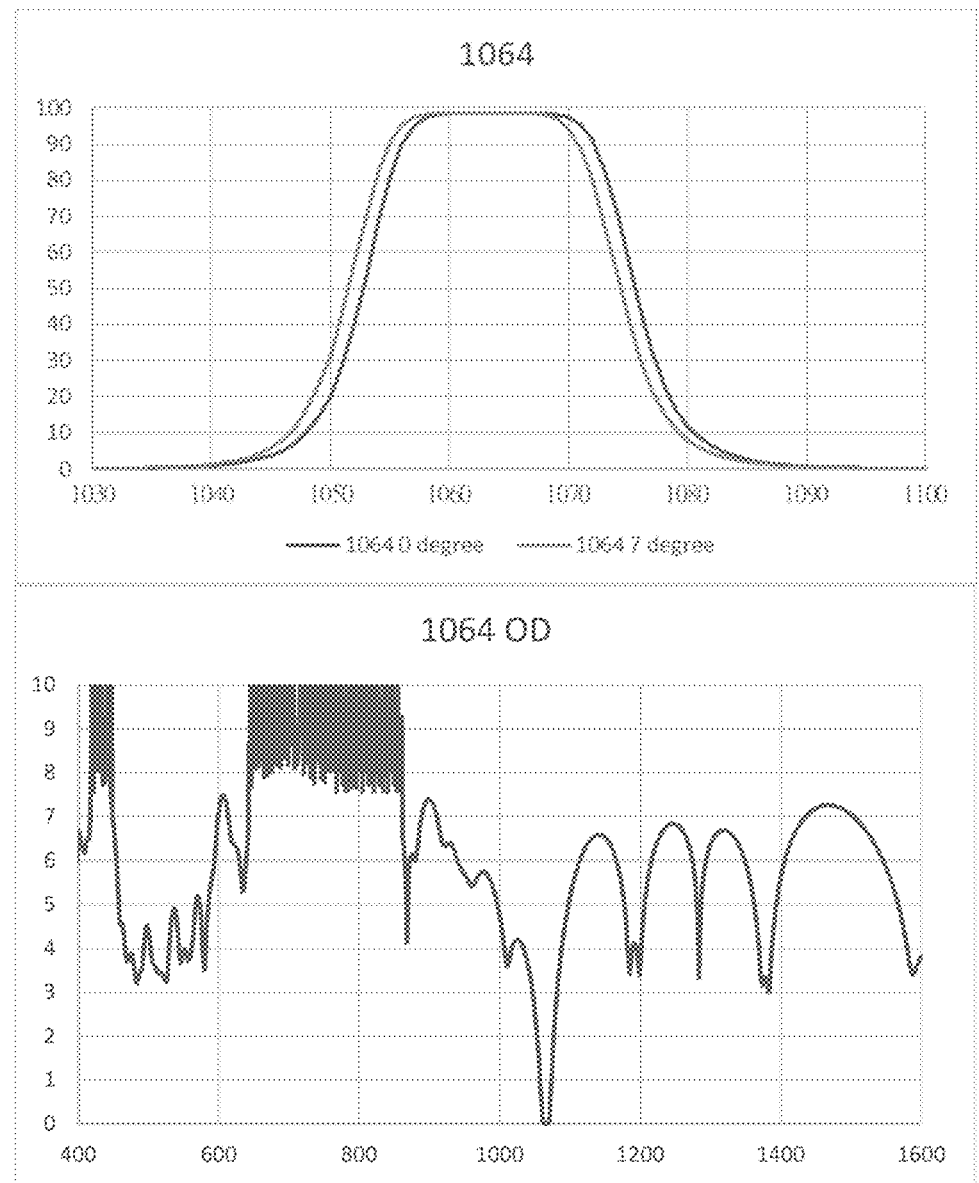
FIG. 10 is a spectrum diagram of the third embodiment of the infrared bandpass filter structure according to the present invention.

Referring to FIGS. 9 and 10, a third embodiment (1064 bandpass filter) of the infrared bandpass filter structure according to the present invention is shown, which is formed by alternately stacking a total number of 33 layers of silicon aluminum hydride layers and silicon aluminum dioxide layers and has an alternately-stacked thickness that is less than 5000 nm. The silicon aluminum oxide layers have a refractive index greater than 3 and close to 3.6 and an extinction coefficient less than 0.0005 in the wavelength range of 800 nm-1600 nm, and have an extinction coefficient greater than 0.005 in the wavelength range of 350 nm-700 nm. The silicon aluminum dioxide layers have a refractive index less than 1.8 and an extinction coefficient less than 0.0005 in the wavelength range of 800 nm-1600 nm. The infrared bandpass filter structure that is formed through stacking has a pass band that at least partly overlaps the wavelength range of 800 nm-1600 nm, and a center wavelength of the pass band has a magnitude of shift that is less than 2 nm when an incident angle changes from 0° to 7°, and OD>3 in a pass band of the wavelength of 400-1000 nm and 1120-1600 nm when the incident angle changes from 0° to 7°.

Figures 11, 12:
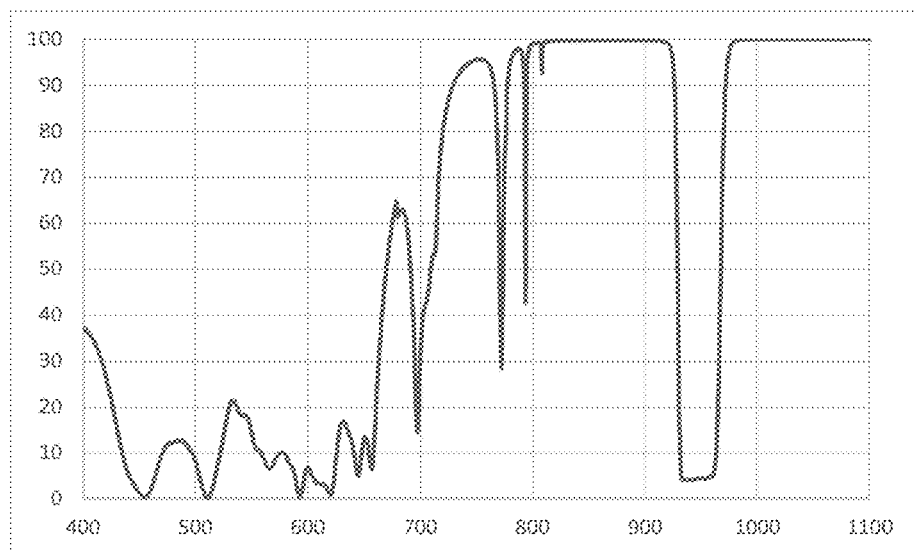
FIG. 11 is a schematic view illustrating a film layer structure of a visible light reflection experiment of the infrared bandpass filter structure according to the present invention.
FIG. 12 is a spectrum diagram of the visible light reflection experiment of the infrared bandpass filter structure according to the present invention.
Figure 13:
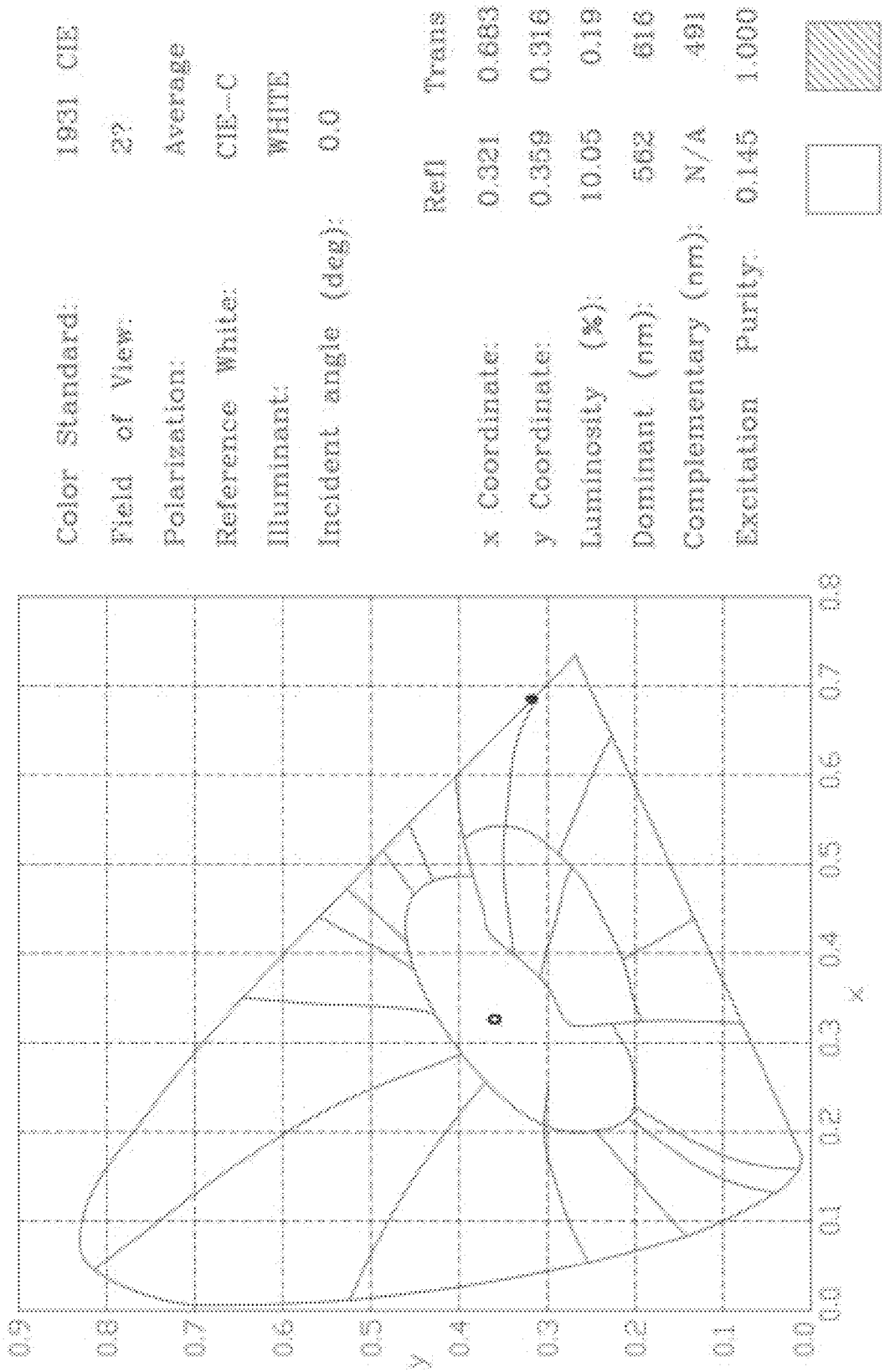
FIG. 13 is diagram illustrating a color coordinate range for the visible light reflection experiment of the infrared bandpass filter structure according to the present invention.

Referring to FIGS. 11-13, a visible light reflection experiment of the infrared bandpass filter structure according to the present invention is shown, which is formed by alternately stacking a total number of 37 layers of silicon aluminum hydride layers and silicon aluminum dioxide layers, which has a reflection rate lower than 20% at Rx coordinate 0.2-0.5, Ry coordinate 0.2-0.5 of a color coordinate system in a visible light range.

The infrared bandpass filter structure and the infrared bandpass filter using such a structure according to the present invention have the following advantages:

(1) The present invention provides an infrared bandpass filter structure that is formed by alternately stacking a plurality of silicon aluminum hydride layers 21 and a plurality of low-refractive-index layers 22 and has a pass band of which a center wavelength exhibits a reduced magnitude of shift (around 10.3-10.5 nm) that is less than 11 nm when an incident angle changes from 0° to 30°, so that applications thereof to three-dimensional image forming systems would make it hard to generate issues of being incapable of recognition or failure of recognition.

(2) The present invention adopts a silicon-aluminum target that is doped with an aluminum ingredient would be more capable of bearing more than two times of power output (around 10-20 kw) than conventionally used pure silicon targets, so that the time required for coating films can be reduced at least by half and equivalently, the throughput for the same period of time could be more than double, and thus, costs of resources including production time consumed in the entire shop, human labor, and electrical power can be cut by half to thereby greatly improve the power of competition.

(3) The present invention uses film layers that can be made with a reduced thickness due to the property of excellent ductility of the aluminum ingredient involved, so that coating on a glass substrate may provide a reduced film thickness and thus a reduced internal stress and the reduced internal stress would help prevent occurrence of corner chipping in a subsequent cutting operation thereby enhancing yield rate of the cutting operation to thus achieve, equivalently, a purpose of lowering fabrication costs.

We claim:

1. An infrared bandpass filter structure, which is formed by alternately stacking a plurality of silicon aluminum hydride (SiAl:H) layers and a plurality of low-refractive-index layers, the plurality of low-refractive-index layers comprising oxide, the infrared bandpass filter structure having a pass band that at least partly overlaps a wavelength range of 800 nm-1600 nm, the pass band having a center wavelength, the center wavelength having a magnitude of shift that is less than 11 nm when an incident angle changes from 0° to 30°.

2. The infrared bandpass filter structure according to claim 1, wherein the infrared bandpass filter structure has a thickness of 3000-5500 nm.

3. The infrared bandpass filter structure according to claim 1, wherein the infrared bandpass filter structure has a high OD value in a wavelength range of 350 nm-1600 nm and has a transmission rate in a wavelength range of 800 nm-1600 nm.

4. The infrared bandpass filter structure according to claim 1, wherein the infrared bandpass filter structure has a reflection rate lower than 20% at a site of Rx coordinate 0.2-0.5, Ry coordinate 0.2-0.5 of a color coordinate system in a visible light range.

5. The infrared bandpass filter structure according to claim 1, wherein the plurality of silicon aluminum hydride layers have a refractive index of 3.1-3.6 and an extinction coefficient of 1.e-4-1.e-6 in the wavelength range of 800 nm-1600 nm and an extinction coefficient greater than 0.005 in the wavelength range of 350 nm-700 nm.

6. The infrared bandpass filter structure according to claim 1, wherein the plurality of low-refractive-index layers comprise at least one of silicon aluminum dioxide ($SiAl:O_2$), silicon aluminum nitride (SiAl:N), silicon nitride (SiN), silicon dioxide ($SiO_2$), aluminum(III) oxide ($Al_2O_3$), titanium dioxide ($TiO_2$), niobium pentoxide ($Nb_2O_5$), tantalum pentoxide ($Ta_2O_5$), and a mixture thereof.

7. The infrared bandpass filter structure according to claim 1, wherein the plurality of low-refractive-index layers have a refractive index less than 1.8 and an extinction coefficient less than 0.0005 in the wavelength range of 800 nm-1600 nm.

8. An infrared bandpass filter, comprising:
   a substrate, which has a first side surface and a second side surface at one side opposite to the first side surface;
   an infrared bandpass filter structure, which is formed on the first side surface of the substrate and is formed by alternately stacking a plurality of silicon aluminum hydride (SiAl:H) layers and a plurality of low-refractive-index layers, the plurality of low-refractive-index layers comprising oxide, the infrared bandpass filter structure having a pass band that at least partly overlaps a wavelength range of 800 nm-1600 nm, the pass band having a center wavelength, the center wavelength having a magnitude of shift that is less than 11 nm when an incident angle changes from 0° to 30°; and
   an antireflection (AR) layer, which is formed on the second side surface of the substrate.

9. The infrared bandpass filter according to claim 8, wherein the infrared bandpass filter structure has a thickness of 3000-5500 nm.

10. The infrared bandpass filter according to claim 8, wherein the infrared bandpass filter structure has a high OD value in a wavelength range of 350 nm-1600 nm and has a transmission rate in a wavelength range of 800 nm-1600 nm.

11. The infrared bandpass filter according to claim 8, wherein the infrared bandpass filter structure has a reflection rate lower than 20% at a site of Rx coordinate 0.2-0.5, Ry coordinate 0.2-0.5 of a color coordinate system in a visible light range.

12. The infrared bandpass filter according to claim 8, wherein the plurality of silicon aluminum hydride layers have a refractive index of 3.1-3.6 and an extinction coefficient of 1.e-4-1.e-6 in the wavelength range of 800 nm-1600 nm and an extinction coefficient greater than 0.005 in the wavelength range of 350 nm-700 nm.

13. The infrared bandpass filter according to claim 8, wherein the plurality of low-refractive-index layers comprise at least one of silicon aluminum dioxide ($SiAl:O_2$), silicon aluminum nitride (SiAl:N), silicon nitride (SiN), silicon dioxide ($SiO_2$), aluminum(III) oxide ($Al_2O_3$), titanium dioxide ($TiO_2$), niobium pentoxide ($Nb_2O_5$), tantalum pentoxide ($Ta_2O_5$), and a mixture thereof.

14. The infrared bandpass filter according to claim 8, wherein the plurality of low-refractive-index layers have a refractive index less than 1.8 and an extinction coefficient less than 0.0005 in the wavelength range of 800 nm-1600 nm and have an extinction coefficient greater than 0.005 in the wavelength range of 350 nm-700 nm.

15. The infrared bandpass filter according to claim 8, wherein the antireflection layer is formed by stacking a plurality of high-refractive-index materials of silicon aluminum hydride (SiAl:H) and a plurality of low-refractive-index materials, the low-refractive-index materials comprising at least one of silicon aluminum dioxide (SiAl:O2), silicon dioxide (SiO2), aluminum(III) oxide ($Al_2O_3$), titanium dioxide ($TiO_2$), niobium pentoxide ($Nb_2O_5$), tantalum pentoxide ($Ta_2O_5$), and a mixture thereof.

16. The infrared bandpass filter according to claim 8, wherein the antireflection layer has a thickness of 3000 nm-6000 nm.

* * * * *